V. G. APPLE.
SHAFT COUPLING.
APPLICATION FILED OCT. 21, 1918.

1,312,296.

Patented Aug. 5, 1919.

Witnesses:
Robert H. Weir
Arthur N. Parlor

Inventor
Vincent G. Apple
Jones Rain & Rean
Attys.

UNITED STATES PATENT OFFICE.

VINCENT G. APPLE, OF DAYTON, OHIO.

SHAFT-COUPLING.

1,312,296.   Specification of Letters Patent.   Patented Aug. 5, 1919.

Application filed October 21, 1918.   Serial No. 259,009.

*To all whom it may concern:*

Be it known that I, VINCENT G. APPLE, a citizen of the United States, residing at Dayton, in the county of Montgomery and State of Ohio, have invented certain new and useful Improvements in Shaft-Couplings, of which the following is a specification.

My invention relates to improvements in shaft couplings and consists in certain new and useful improvements in construction, as hereinafter fully set forth and pointed out in the appended claims.

The object of my invention is to provide a shaft coupling, which is rotatably yielding, to an extent, until there is a given relative rotary displacement of the shaft members, after which the connections between the driving and driven shaft members is of a positive nature, thereby to permit initial rotation of the driving member, for a part of a revolution, with a gradually increasing resistance to the torque effort until the predetermined resistance is interposed by the spring, after which the shafts are automatically associated in positive driving relation.

Another object of my invention is to provide a shaft coupling, as specified, which will automatically compensate for slight, axial displacement of the shaft members without introducing objectionable features of operation.

My invention is especially desirable in coupling electric motors to a load to be driven, to permit initial movement of the armature, so that it may pass through one of its phases of operation before it positively takes on the load to be driven by it.

An illustrative example of its use is where an electric motor is employed for starting a gas engine. When the armature is first energized it is permitted to move a given circumferential distance before it takes on its load, thereby permitting it to develop a given counter-electromotive force, at a relatively high speed, before the load is taken on by the armature, thus increasing the efficiency of the armature and its power factor at the time of starting its load.

Other and further objects of my invention will become readily apparent, to those skilled in the art, from a consideration of the following description when taken in conjunction with the drawings, wherein:—
Figure 1 is a central section of the coupling and two shafts connected thereby.

In all the views the same reference characters are employed to indicate similar parts.

Figure 2:
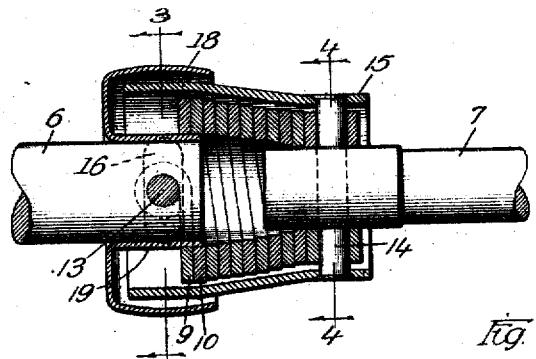
Fig. 2 is a similar view at right angles to the section shown in Fig. 1.
Figure 3:
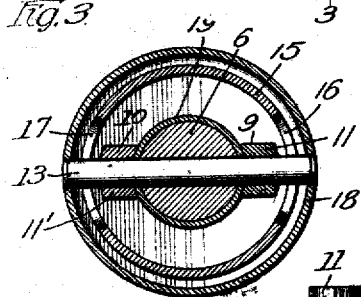
Fig. 3 is a section taken on line 3—3 of Fig. 2.
Figure 4:
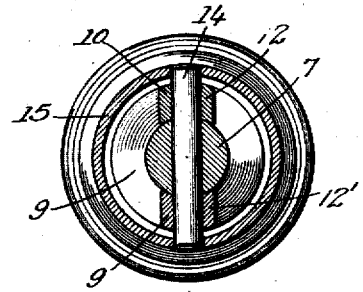
Fig. 4 is a section taken on line 4—4 of Fig. 2.
Figure 5:
Fig. 5 is a perspective view of one of the springs by which the shafts are yieldingly coupled together.

The shaft 6 is shown connected to the shaft 7 by the coupling 8. In the drawings I have shown a spring 9 and a parallel spring 10 coiled in the same direction and having their ends coupled to the respective shafts. A single spring will answer the purpose but a double spring is more desirable because then the ends or terminals 11 and 12, 11' and 12', being fashioned into eyes, having their axes at right angles to each other, may be coupled at four equal circumferential points around the two shafts. The spring 9, for instance, is coupled to the far end of the pin 13, as shown in Fig. 2, while its other end is connected to the pin 14 at right angles to the pin 13. In the same respect the spring 10 is connected to the other end of the pin 13 and to the opposite end of the pin 14. A sleeve, or housing 15, overlies the two springs and is connected at one end rigidly, to the pin 14, and is therefore positively driven with the shaft 7. In its forward end, it is slotted on opposite sides, as at 16 and 17, and through this slot the pin 13 passes freely into another housing or pulley 18, in which it is rigidly connected. The pin 13 also passes through the inner hub 19 of the housing or pulley 18 to rigidly connect it to shaft 6.

Figure 1:
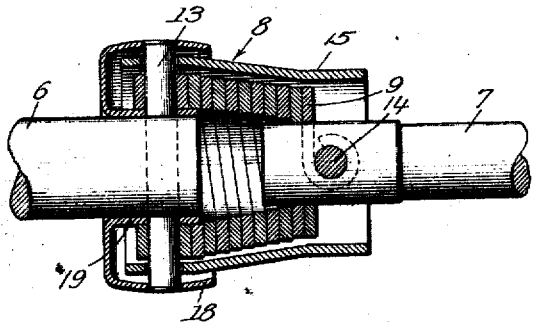

Now it is manifest, when the convolutions of the springs 9 and 10 are in close contact with each other, as shown in Figs. 1 and 2, that power equivalent to a torque effort less than that exerted by the resistance of the springs, may be transmitted from the shaft 6 to the shaft 7. Just about the time that the springs are brought into condition with their convolutions in contact, the pin 13, by the lagging rotative displacement of the shaft 6, with regard to the shaft 7, makes contact with the sleeve at the limit of the slots 16 and 17. By this means the strain is taken from the springs and is positively transmitted through the pin 13, the sleeve 15 and the pin 14. In a state of rest, the springs will bring the pins 13 and 14 into position where their axes are at substantial right angles to each other with their convolutions slightly separated, and therefore the driving shaft 6, in the event that this is the driving shaft, may be moved with relation to shaft 7, at least 10 or 12 degrees before the pin 13 is brought into actual contact with the enveloping sleeve 15. Should either or both springs become broken, power could be transmitted from one shaft to the other by the sleeve and pin connection.

From the foregoing description, taken in conjunction with the drawings, it will be apparent to those skilled in the art, that considerable axial displacement of the two shafts will be compensated for by the resiliency of the spring connection, or coupling, which will not materially affect the operation of the device in translation of power from one shaft to the other.

The drawings show that the housing 18 is in the form of a pulley and it may be utilized for this purpose and furthermore the drawings show that the sleeve 15 is tapered. This is done for conforming to the different sizes of the shafts 6 and 7. The apparatus would work equally as well if the sleeve and the springs were of uniform diameter.

While I have herein shown a single embodiment of my invention, for the purpose of clear disclosure, it will be manifest, to those skilled in the art, that changes may be made in the general arrangement and configuration of the parts within the spirit and scope of the appended claims.

Having described my invention, what I claim is:—

1. A shaft coupling for two coaxially arranged shafts comprising a helically wound spring connected at its ends to the respective shafts and a means to cause the driving shaft to positively engage the driven shaft after a given rotary displacement of said shafts.

2. A shaft coupling for two coaxially arranged shafts comprising a helically wound spring connected at its ends to the respective shafts; a housing inclosing the said spring connected to one said shaft at one of its ends and having an elongated circumferentially extending slot in its other end and a pin from the second named shaft extending through said slot.

3. A shaft coupling for two coaxially arranged shafts comprising a helically wound spring connected at its ends to the respective shafts; a sleeve overlying the said spring having a circumferentially extending slot in one end; a pin passing through one said shaft, one end of the spring and the unattached end of the sleeve and another pin passing through the other shaft, the other end of the spring and the slot in the sleeve.

4. A shaft coupling comprising two helically wound parallel springs, each spring having its terminals at right angles to each other for connection to two shaft to be coupled together; means to connect such prings positively to the respective coaxially arranged shafts, and means positively connected to one shaft and having lost motion connection to the other shaft whereby to positively connect both shafts together irrespective of the springs when the said shafts have been rotatively displaced with respect to each other to a predetermined extent.

In testimony whereof I hereunto subscribe my name.

VINCENT G. APPLE.